US007201322B2

(12) United States Patent
Olmstead et al.

(10) Patent No.: US 7,201,322 B2

(45) Date of Patent: Apr. 10, 2007

(54) SYSTEM, CIRCUIT, AND METHOD FOR EDGE DETECTION IN A BINARY OPTICAL CODE

(75) Inventors: Bryan L. Olmstead, Eugene, OR (US); James E. Colley, Junction City, OR (US); Patrick M. O'Donnell, Springfield, OR (US)

(73) Assignee: PSC Scanning, Inc., Eugene, OR (US)

(*) Notice: Subject to any disclaimer, the term of this patent is extended or adjusted under 35 U.S.C. 154(b) by 0 days.

(21) Appl. No.: 10/866,308

(22) Filed: Jun. 10, 2004

(65) Prior Publication Data

US 2005/0274808 A1 Dec. 15, 2005

(51) Int. Cl.

| | |
|---|---|
| ***G02B 26/10*** | (2006.01) |
| ***G06K 7/10*** | (2006.01) |
| ***G06K 9/22*** | (2006.01) |
| ***G06K 19/06*** | (2006.01) |

(52) U.S. Cl. ................................................ 235/462.25

(58) Field of Classification Search ................ 235/462, 235/462.25, 462.24, 462.21, 462.01, 462.28, 235/462.29, 462.16, 462.32, 462.31, 461, 235/454; 382/193, 196–199

See application file for complete search history.

(56) References Cited

U.S. PATENT DOCUMENTS

| | | | | |
|---|---|---|---|---|
| 4,000,397 | A | 12/1976 | Hebert et al. | 235/61.11 |
| 5,302,813 | A | 4/1994 | Goren | 235/462 |
| 5,449,893 | A | 9/1995 | Bridgelall et al. | 235/462 |
| 5,514,858 | A | 5/1996 | Ackley | |
| 5,633,488 | A | 5/1997 | Spitz | |
| 5,734,152 | A | 3/1998 | Goren et al. | 235/462 |
| 6,012,639 | A | 1/2000 | Colley et al. | 235/462.16 |
| 6,012,640 | A | 1/2000 | Liu | |
| 6,036,091 | A * | 3/2000 | Spitz | 235/462.25 |
| 6,209,788 | B1 * | 4/2001 | Bridgelall et al. | 235/462.32 |
| 6,499,662 | B1 | 12/2002 | Coleman | |
| 6,978,937 | B2 | 12/2005 | Iwaguchi | |
| 2004/0256462 | A1 * | 12/2004 | Solen et al. | 235/462.09 |

* cited by examiner

*Primary Examiner*—Michael G. Lee
*Assistant Examiner*—Thien T. Mai
(74) *Attorney, Agent, or Firm*—Stoel Rives LLP

(57) ABSTRACT

Systems better detect transitions in a binary optical code signal and thus better detect edges in binary optical codes, such as bar codes. The optical code signal imperfectly indicates perceived regions of relatively dark and light areas arranged in an alternating pattern as part of an optical code. That signal is differentiated to form a first derivative. Due to various non-ideal conditions, the first derivative may have a series of successive local peaks of the same polarity. Peaks in the series having a peak value less than a previous peak value in the series are ignored, thereby resulting in a set of unignored peaks. From the unignored peaks in the series is chosen the one peak occurring last in order. According to the chosen peak, there is generated a signal more reliably indicating the true edge position between light and dark areas in the pattern.

37 Claims, 8 Drawing Sheets

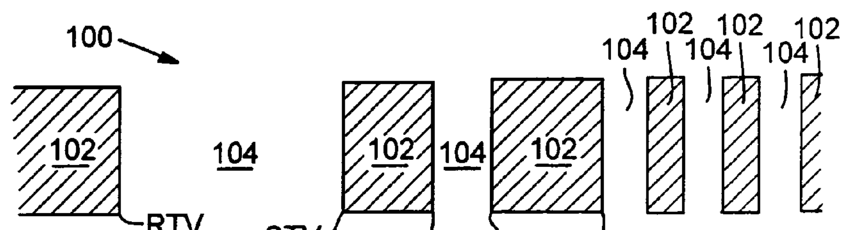
FIGURE 1A (Prior Art)
x(t)
FIGURE 1B (Prior Art)
x'(t)
+T
–T
FIGURE 1C (Prior Art)
x"(t)
FIGURE 1D (Prior Art)
$y_S(t)$
FIGURE 1E (Prior Art)
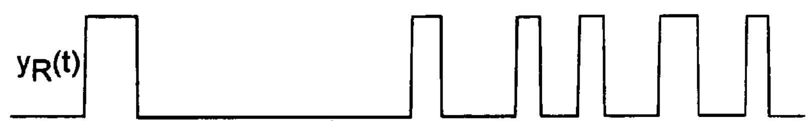
FIGURE 1F (Prior Art)
RTV
FIGURE 1G (Prior Art)
STV
FIGURE 1H (Prior Art)

SYSTEM, CIRCUIT, AND METHOD FOR EDGE DETECTION IN A BINARY OPTICAL CODE

TECHNICAL FIELD

The field of this disclosure relates generally to optical code readers, such as, for example, bar code readers, and more particularly to signal processing techniques and circuitry for determining edge positions in a binary optical code.

BACKGROUND

Today bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., oranges) or a unique item (e.g., U.S. Pat. No. 6,012,639). FIG. 1A depicts a segment of a typical bar code 100, with alternating bars (i.e., dark areas) 102 and spaces (i.e., light areas) 104. The positions of the bars 102 and spaces 104 encode particular information. More specifically, the widths of the bars 102 and spaces 104 are often set to encode a desired information sequence, as the pattern of bars and spaces represents a string of binary ones and zeros, wherein the width of any particular bar or space is an integer multiple of a specified minimum width, which is called a "module" or "unit." Thus, to decode the information, a bar code reader must be able to reliably discern the edge locations of the bars 102 and the spaces 104. The leading edge of a bar (i.e., a light-to-dark transition) is commonly denoted as an STV (set video), and the trailing edge of a bar (i.e., a dark-to-light transition) is commonly denoted as an RTV (reset video). The first several STVs and RTVs of the bar code 100 are labeled in FIG. 1A, assuming (arbitrarily) that the bar code is scanned from left to right.

Optical scanning equipment can be utilized to generate an electrical signal indicative of the positions of bars and spaces in a bar code. Such a signal, denoted x(t), is depicted in simplified form in FIG. 1B for the corresponding bar code 100. Before describing the processing of the signal x(t), a brief description of the optical scanning equipment that generates that signal is helpful. A more complete introduction to the optical scanning of bar codes can be found in the background section of the above-noted U.S. Pat. No. 6,102,639, the entirety of which is incorporated by reference herein. Typical optical scanning equipment comprises one or more illumination sources and one or more photodetectors. The illumination source may be a laser producing a focused beam spot on a small area of the bar code 100. As the laser spot and the bar code 100 move relative to each other, such that the spot is scanned across the bar code 100, a photodetector detects the laser light reflected off the bar code 100 and produces an electrical signal whose magnitude is related to the optical power of the reflected signal. Thus, as the spot scans across the bar code 100, the photodetector generates an electrical signal whose variations over time at least roughly correlate to the spatial pattern of bars 102 and spaces 104 in the bar code 100. Alternatively, the illumination source may be diffuse across the entire bar code 100, and the bar code may be imaged using a charge-coupled device (CCD) camera or a CMOS (complementary metal-oxide-semiconductor) imager, either of which forms an electronic image of the bar code 100. That electronic image can be sampled in the forward direction of the bar code 100 to generate a virtual scan line signal, much like the scan line signal generated with a scanning laser spot. In any event, the result is an electronic signal, which, at least ideally, somehow relates to the spatial positions of the bars 102 and spaces 104 in the bar code 100. The next step is to process that signal to determine with some reliability where the edges (STVs and RTVs) lie.

FIG. 2 is schematic diagram of a conventional edge detection system 200 for processing the scan line signal x(t) illustrated in FIG. 1B. The system 200 performs edge detection using a typical gated peak detection scheme. In general functional terms, the system 200 operates by forming the first and second derivatives of the scan line signal x(t) and by detecting zero crossings of the second derivative, which ideally represent optical edges. Moreover, the system 200 qualifies zero crossings of the second derivative only if the first derivative exceeds a threshold. In terms of hardware, the system 200 includes a double differentiator 220, an envelope detector 230, three comparators 240, 242, and 246, and two logical AND gates 250 and 255. The hardware operates as follows: As a preliminary matter, a preamplifier (not shown) may amplify, buffer, invert and/or condition the scan line signal x(t), which is received at the input of the differentiator 220. The differentiator 220 produces a first derivative signal x'(t) and second derivative signal x"(t), respectively. While it is also possible to generate the first and second derivative signals x'(t) and x"(t) using two separate single differentiators, it is preferable to use common hardware to produce both to ensure more easily that x'(t) are x"(t) are time-aligned, as described in U.S. Pat. No. 6,073,849, which is incorporated herein by reference. The envelope detector 230 processes the first derivative signal x'(t) to determine, based on the extreme maximum and minimum values of that signal, a threshold value T somewhat smaller in magnitude than those extreme values. One example of a suitable implementation of the envelope detector 230 is disclosed in U.S. Pat. No. 4,000,397, which is incorporated herein by reference. By comparing the first derivative signal x'(t) to that threshold value, the comparators 240 and 242 detect peaks in that signal and produce respective logical true-valued outputs $y_S(t)$ and $y_R(t)$ when the first derivative signal x'(t) exceeds the threshold value. Because sharp transitions in the value of the scan signal x(t) should produce peaks in the first derivative signal x'(t), either $y_S(t)$ and $y_R(t)$ should be a logical true value during such peaks ($y_S(t)$ being true during a minimum or negative peak, and $y_R(t)$ being true during a maximum or positive peak). Because the second derivative signal should cross zero at such peaks, the comparator 246 is configured to detect those zero crossings and enable the appropriate AND gate 250 or 255, respectively, to generate the STV or RTV signal, such that only one of which is true at any given time.

Further insight into the operation of the system 200 can be gleaned by returning to FIG. 1, in which FIGS. 1B–1H are voltage-versus-time plots for various signals in the system 200. FIG. 1B, as already noted, is a plot of the scan line signal x(t), which is derived from a photodetector current, which is generally at a higher value during the spaces 104 and a lower value during the bars 102, as more light is reflected from the spaces 104 than the bars 102. (Depending upon the optical scanning equipment, that relationship may be reversed.) However, the scan line signal x(t) is not a perfect representation of the bar code 100 for a variety of reasons discussed below. FIG. 1C is a plot of the first derivative signal x'(t), including the threshold levels +T and −T. FIG. 1D is the second derivative signal x"(t), which, as one can see, crosses zero whenever the x'(t) is at a peak. FIG. 1E shows the signal $y_S(t)$, the output of the comparator 240. As can be seen, assuming high-true logic levels, as utilized in this figure, $y_S(t)$ is high when x'(t)<−T. Similarly, FIG. 1F shows the signal $y_R(t)$, the output of the comparator 242, which is high when x'(t)>+T. Finally, FIGS. 1G and 1H are plots of the RTV and STV signals, respectively, which are the logical AND combination of $y_R(t)$ and the condition that x"(t)<0, and $y_S(t)$ and the condition that x"(t)>0.

As the inventors have recognized, a shortcoming of the system 200 is that the STV and RTV signals may contain multiple pulses for a single transition in the bar code 100 and thus do not unambiguously indicate edge positions in the bar code 100. This is due to the fact that more than one peak can occur in the first derivative signal x'(t) for a single real edge in the bar code 100—a phenomenon that can be called "peak multiplication." There are several reasons why more than one peak may appear in x'(t) for a given real transition edge. Some reasons are attributable to the optical scanner. For example, the spot profile of the laser beam may have multiple peaks. Another reason may be noise introduced by the optical scanner or the electronic circuitry. Other reasons are traceable to external factors, including poor bar code printing quality, poor substrate quality or roughness, inconsistent bar or space color, modulated lighting effects, etc. Regardless of the cause, each local first derivative peak is detected as a separate like edge by the system 200. However, multiple adjacent edges of the same type (STV or RTV) cannot be legitimate, as adjacent edges must be of alternating types. Only one edge in such a group is the best estimate of the true edge position.

Other edge detection techniques suffer from the same problem. For example, multi-bit digitizers, such as the systems disclosed in U.S. Pat. Nos. 5,302,813, 5,449,893, and 5,734,152, which operate by digitizing the first derivative peaks for an entire scan line and then applying various thresholds to the entire digitized record until a decodable peak pattern results, perform poorly in the presence of ISI (inter-symbol interference) and do not inherently ensure that multiple adjacent edges are rejected.

Bar codes are just one example of the many types of optical codes in use today. In general, optical codes encode useful, optically-readable information about the items to which they are attached or otherwise associated. While bar codes generally encode information across one dimension, higher-dimensional optical codes are also possible, such as, two-dimensional matrix codes (e.g., MaxiCode) or stacked codes (e.g., PDF 417). Decoding binary optical codes in general poses the same challenges, such as peak multiplication, posed by bar codes in particular.

SUMMARY

The present invention is directed to methods, systems, and circuits for detecting transitions in a binary optical code signal, and thus detecting edges in a binary optical code.

One preferred method is directed to detecting edges in a binary optical code by processing a signal imperfectly indicating perceived regions of relatively dark and relatively light areas arranged in an alternating pattern as part of a binary optical code. The method differentiates the signal to form a first derivative of the signal. The first derivative may have a series of successive local peaks of the same polarity. The method ignores peaks in the series having a peak value less than a previous peak value in the series, thereby resulting in a set of unignored peaks. The method then chooses from the unignored peaks in the series the one peak occurring last in order. Finally, the method generates, according to the chosen peak, a signal indicative of an edge between a light area and a dark area in the pattern.

According to another preferred embodiment, a system processes a signal imperfectly indicating perceived regions of relatively light and dark areas arranged in an alternating pattern as part of a binary optical code. The system comprises a differentiator, two comparators, and a circuit. The differentiator generates a first derivative of the signal. A first comparator, which is connected to the differentiator, compares the first derivative to a positive threshold and produces an output when the first derivative exceeds the positive threshold. The second comparator, which is also connected to the differentiator, compares the first derivative to a negative threshold and produces an output when the first derivative is less than the negative threshold. The circuit receives as inputs the first derivative, the output of the first comparator, and the output of the second comparator. The circuit generates a first output representative of a largest magnitude positive peak in a series of consecutive positive local peaks in the first derivative and a second output representative of a largest magnitude negative peak in a series of consecutive negative local peaks in the first derivative.

According to another preferred embodiment, a circuit processes an input signal derived from a binary optical code. The input signal has a series of multiple successive local peaks of the same given polarity. The circuit comprises a peak rectifier, an output node, a current mirror, and a discharge path. The peak rectifier has an input receiving the input signal and produces an output that approximately tracks the input signal while the input signal is sloping in the direction of the given polarity and that approximately holds near those local peaks having successively larger magnitude. The current mirror, which is connected to the peak rectifier and the output node, charges the output node while the peak rectifier is tracking the input signal. The discharge path, which is connected to the output node, provides for discharge of the output node while the peak rectifier is holding near a local peak value of the signal.

According to another preferred embodiment, a method determines edge positions in a binary optical code by qualifying zero crossings of a second derivative of an input signal imperfectly indicating perceived regions of relatively dark and relatively light areas arranged in an alternating pattern as part of a binary optical code. The method computes first and second derivatives of the input signal, wherein the second derivative may have multiple zero crossings for a given edge in the binary optical code. The method detects zero crossings of the first and second derivative and utilizes a zero crossing of the second derivative as an indication of a possible edge position in the binary optical code, provided that the zero crossing of the second derivative is the first one occurring after the substantially simultaneous occurrence of (1) the second derivative exceeding a threshold and (2) the first derivative having a magnitude greater than at any previous time since the last zero crossing of the first derivative. The result is a set of one or more qualified second derivative crossings indicating possible positions for the given edge in the binary optical code.

Details concerning the construction and operation of particular embodiments are set forth in the following sections.

BRIEF DESCRIPTION OF THE DRAWINGS

FIGS. 1A–1H depict a segment of a bar code and a set of voltage-versus-time plots for various signals in the circuit of FIG. 2.

DETAILED DESCRIPTION OF EMBODIMENTS

With reference to the above-listed drawings, this section describes particular embodiments and their detailed construction and operation. Certain embodiments are capable of achieving certain advantages over the known prior art, including some or all of the following: (1) more reliable detection of the most likely of multiple peaks resulting from peak multiplication; (2) improved edge detection performance under challenging detection conditions in the presence of noise, inter-symbol interference (ISI) (which can result from the laser spot size being large compared to the unit width), poor laser spot quality, poor bar code print quality, and/or small bar code feature size; and (3) improved performance at a small price in terms of circuitry space, weight, and power. These and other advantages of various embodiments will be apparent upon reading the following.

Figure 2:
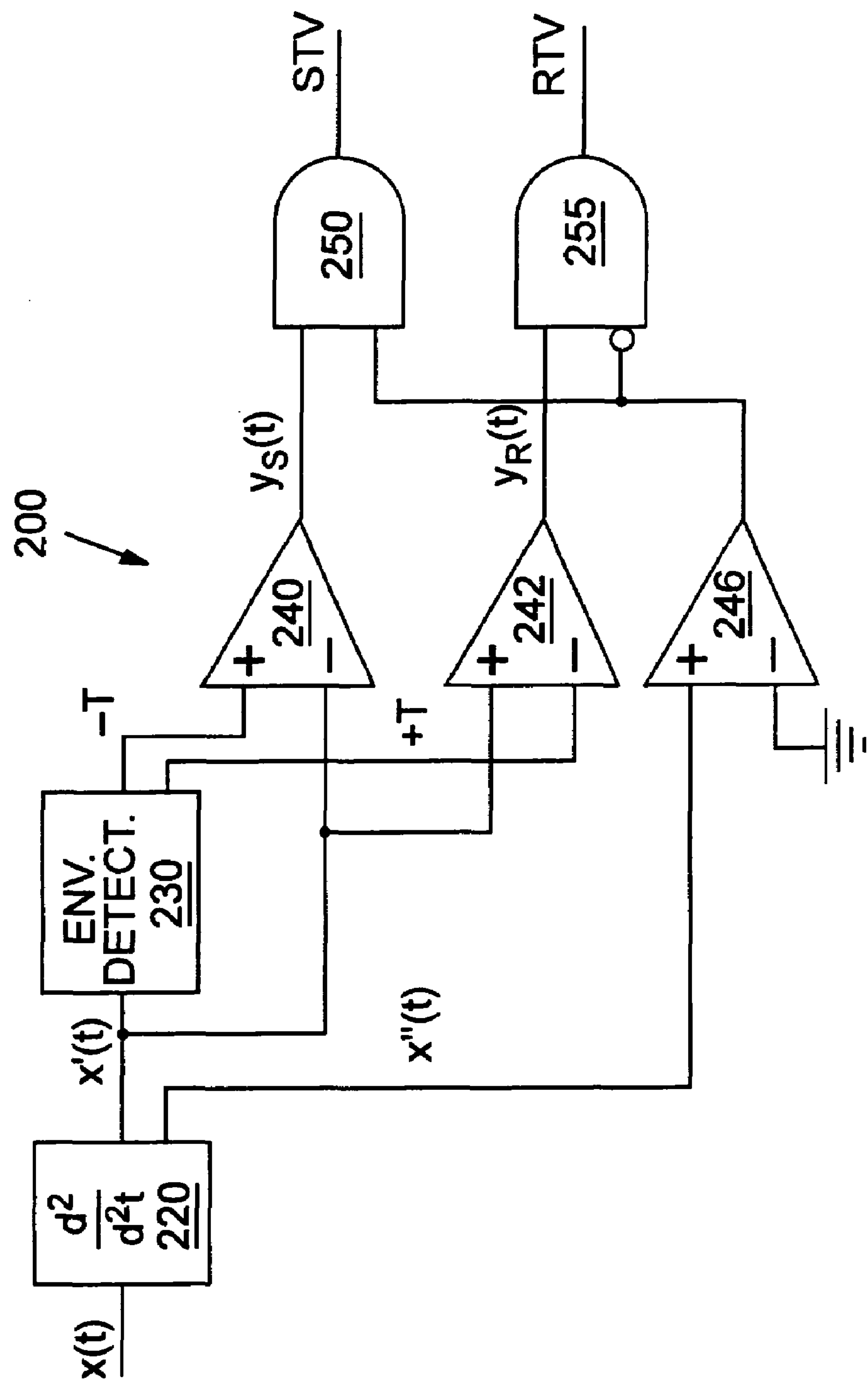
FIG. 2 is a block diagram of a conventional system for detecting edges in the bar code of FIG. 1A.
Figure 3:
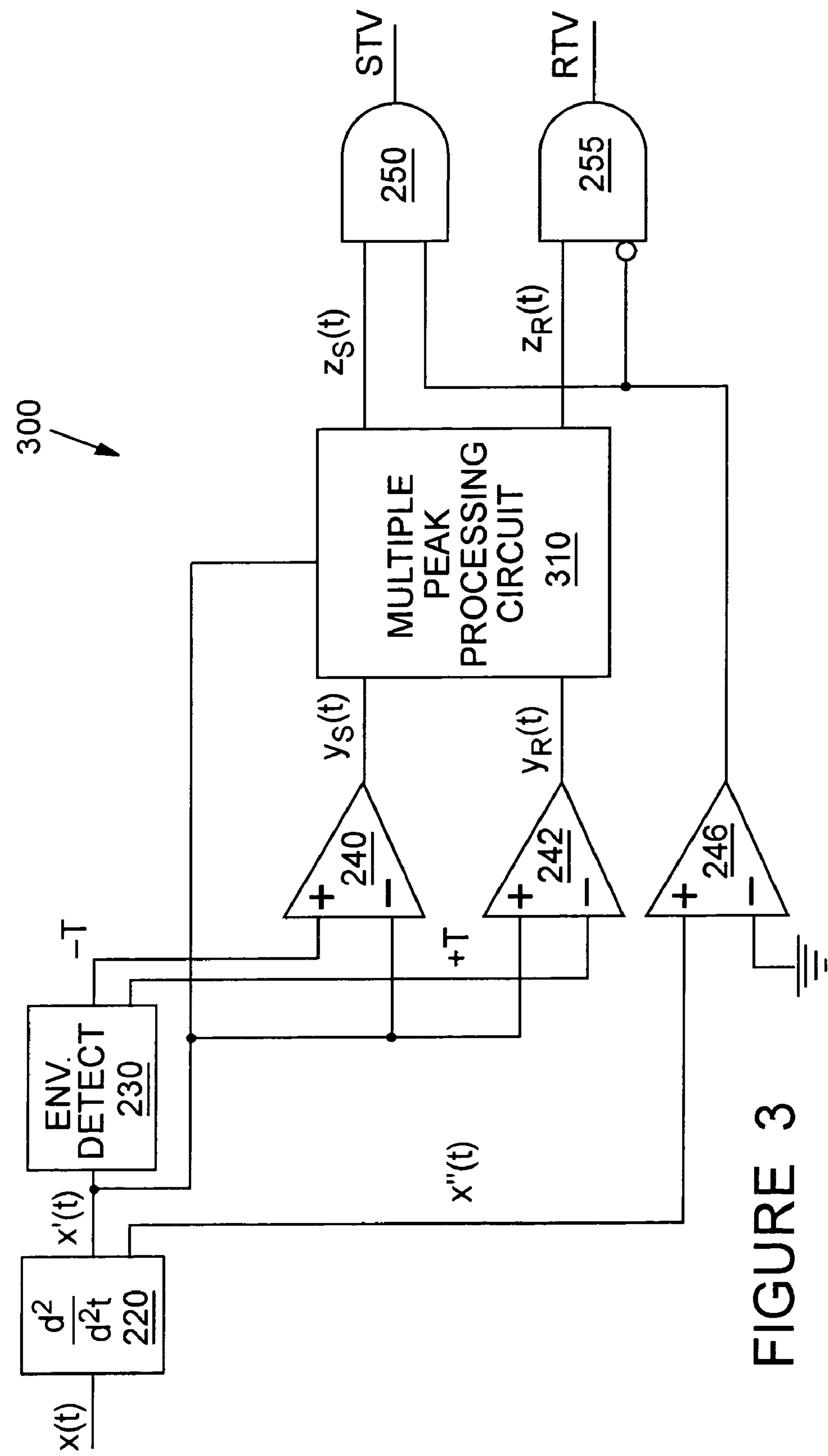
FIG. 3 is a block diagram of an edge detection system according to one embodiment.

FIG. 3 is a block diagram of an edge detection system 300, according to one embodiment. The system 300, like the conventional system 200, operates according to a gated peak detection scheme, whereby zero crossings of the second derivative signal x"(t) are detected and qualified based on the amplitude of the first derivative signal x'(t). Thus, the differentiator 220; envelope detector 230; comparators 240, 242, and 246; and AND gates 250 and 255 can be the same hardware components as in the conventional system 200. Moreover, the gated peak signals $y_S(t)$ and $y_R(t)$ represent in digital form the locations of local maxima and minima, respectively, in the first derivative signal x'(t), just as in the conventional system 200. The system 300 differs from the conventional system 200, however, in the way in which the gated peak signals $y_S(t)$ and $y_R(t)$ are processed. More specifically, the system 300, unlike the conventional system 200, includes a multiple peak processing circuit 310, which functions to reject spurious peaks, as described in greater detail below. The outputs of the multiple peak processing circuit 310 are peak signals $z_S(t)$ and $z_R(t)$, which the system 300 processes just as $y_S(t)$ and $y_R(t)$ in the conventional system 200—viz., to qualify zero crossings of the second derivative signal x"(t).

Figure 4:
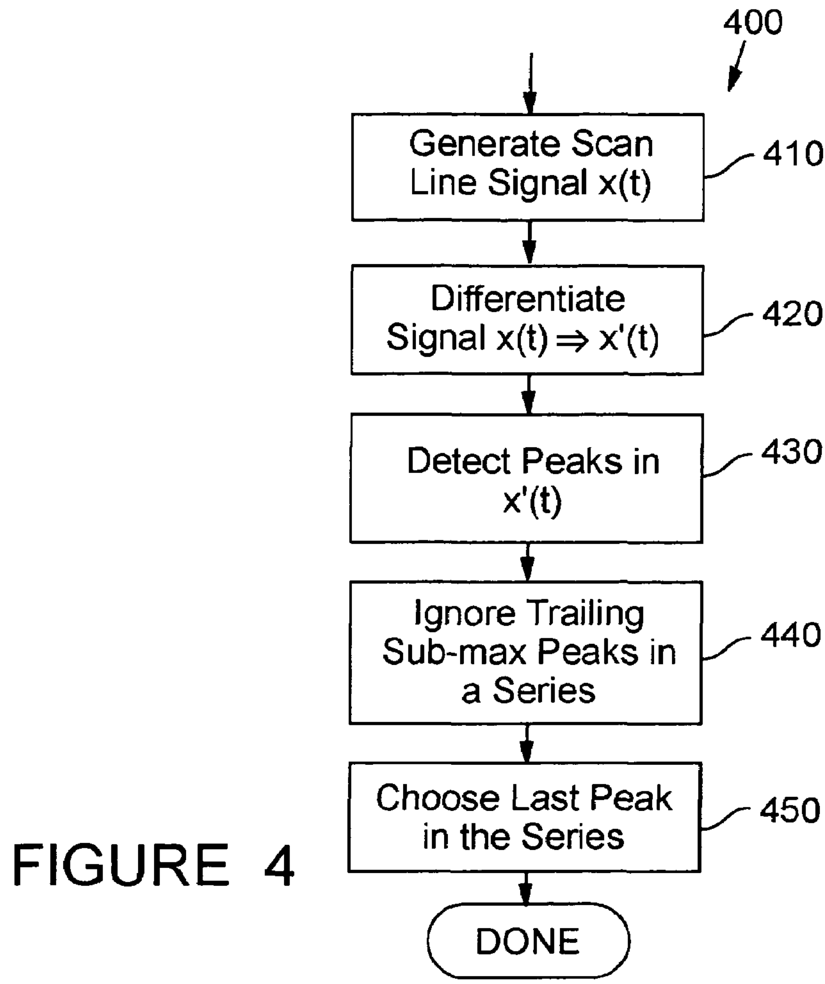
FIG. 4 is a flowchart of a method according to one embodiment.

The functional operation of the multiple peak processing circuit 310 can be understood by examining FIG. 4, which is a flowchart of a method 400 performed by, for example, the system 300. The method 400 begins by generating (step 410) a scan line signal x(t) and differentiating (step 420) that signal. Next, the method 400 detects (step 430) peaks in the first derivative signal x'(t). The output of the detecting step 430 is, in general, for each actual bar code edge, a series of successive like-polarity peaks, such as represented by the gated peak signals $y_S(t)$ and $y_R(t)$. One such series of peaks is labeled $p_1, p_2, \ldots, p_6$ and another is formed by the peaks labeled $p_7, p_8, \ldots, p_{10}$ in FIG. 5, which is a plot of the first derivative signal x'(t) in the vicinities of two edge transitions in a bar code. As shown, peak $p_4$ is the maximum peak in the first group and therefore the most likely one representing the true edge location. However, a number of spurious leading peaks ($p_1$, $p_2$, and $p_3$) and trailing peaks ($p_5$ and $p_6$) are also present in the first group. The method 400 ignores or discards the spurious peaks and chooses the maximum peak $p_4$ in two steps. The first step is ignoring (step 440) any trailing peaks less than the maximum peak so far encountered. The second step is choosing (step 450) the last remaining peak in the series.

Figure 5:
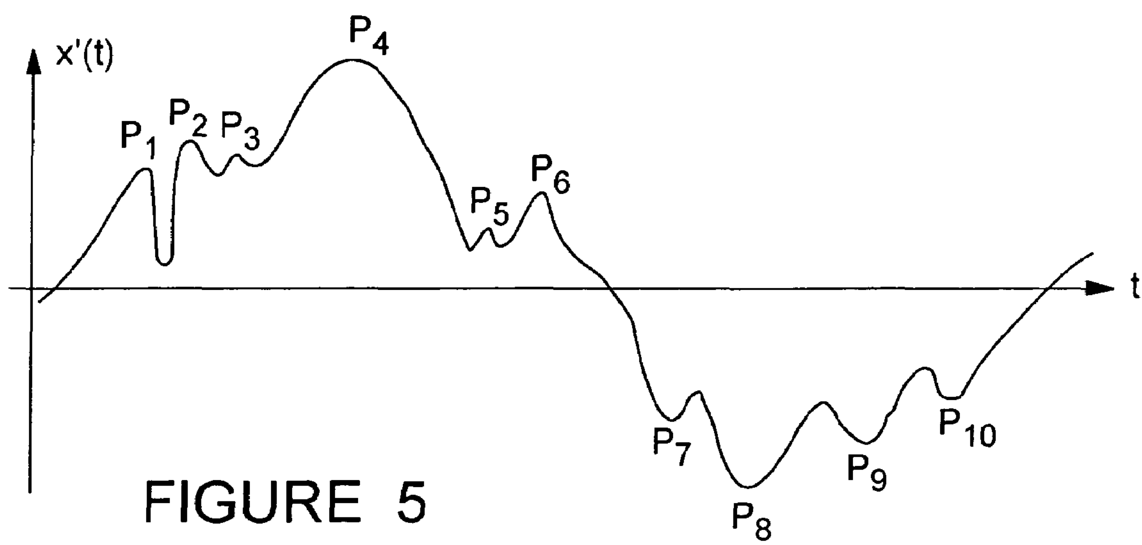
FIG. 5 is a plot of a first derivative signal having a series of local positive peaks and then a series of local negative peaks, illustrating the operation of the method of FIG. 4.

More particularly, with reference to FIG. 5 as an example, the ignoring step 440 first observes peak $p_1$, which it does not discard. So far, peak $p_1$ is the maximum peak encountered. Next, the ignoring step 440 observes peak $p_2$ and does not discard it because, although it trails peak $p_1$, it is not less than $p_1$. Peak $p_2$ now becomes the maximum peak encountered. Next, the ignoring step 440 observes peak $p_3$, which it discards as being less than the maximum at this point (which remains $p_2$). Next, the ignoring step 440 observes peak $p_4$, which it does not discard and which becomes the new maximum peak. Next, the ignoring step 440 observes peaks $p_5$ and $p_6$, which it discards as being less than peak $p_4$. The result of the ignoring step 440 is that peaks $p_3$, $p_5$, and $p_6$ are discarded, while only peaks $p_1$, $p_2$, and $p_4$ are passed to the choosing step 450. The choosing step 450 then chooses peak $p_4$ as the last-in-time peak in the group of non-discarded peaks. The method 400 thus arrives at the peak in the series most likely to represent the true RTV edge.

The multiple peak processing circuit 310 performs either the ignoring step 440 or both the ignoring step 440 and the choosing step 450. The choosing step 450 may be performed either before or after the AND gates 250 and 255. A microcontroller implementation of the choosing step 450 is described fully in the above-referenced U.S. Pat. No. 6,012,639 (see, in particular, the microcontroller 430). Other implementations are possible to achieve the same functionality.

Figure 6:
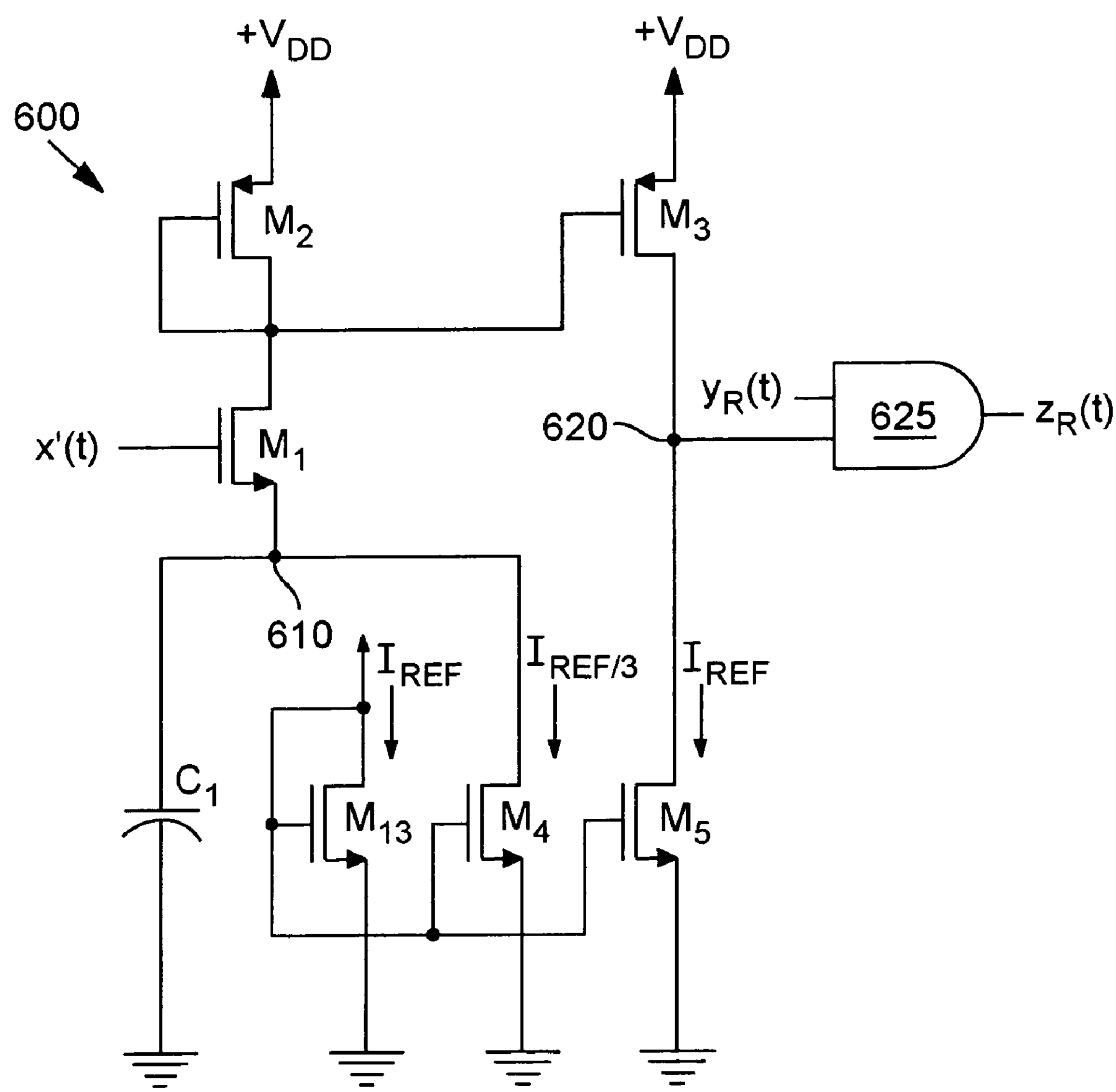
FIG. 6 is a schematic diagram of a circuit performing the ignoring step of the method of FIG. 4.

The ignoring step 440 may be implemented in electronic hardware as set forth, for example, in FIG. 6, which is a schematic diagram of a circuit 600 representing one implementation of one half of the multiple peak processing circuit 310 in the edge detection system 300. For ease of comprehension, the circuit 600 is presented as the circuitry for processing just the positive peaks. The circuit 600 can easily be modified to also operate with an input signal of the opposite polarity; alternatively, a circuit similar to the circuit 600 can easily be constructed to process just the negative peaks.

The circuit 600 operates as follows: The first derivative signal x'(t) is connected to the gate of a transistor $M_1$. When x'(t) is positive and increasing, the transistor $M_1$ turns on and conducts across its source and drain. The turn-on of the transistor $M_1$ has two effects. First, the same currents flow across each of transistors $M_2$ and $M_3$, which form a current mirror. Second, that current charges a capacitor $C_1$, as the transistor $M_1$ and the capacitor $C_1$ form a simple peak rectifier, and the voltage at the node 610 is a peak-rectified version of x'(t). That charging continues until the voltage at the node 610 equals that of x'(t) minus the gate-to-source voltage drop across the transistor $M_1$ ($V_{GSM1}$), and x'(t) stops increasing. During that time of charging, a mirror current flows through the transistor $M_3$, thus pulling the output node 620 to a high voltage (approximately the positive supply voltage $V_{DD}$). As long as x'(t) is increasing at a sufficient rate, the capacitor $C_1$ will continue to charge, and the voltage of the node 620 will remain high.

However, as x'(t) stops increasing, the voltage of the node 620 will begin to discharge. The transistor $M_4$ is set to have a drain-to-source current equal to $I_{REF}/3$, while a transistor $M_5$ is connected between the node 620 and ground, which supplies a drain-to-source current equal to $I_{REF}$. That is accomplished by use of a transistor $M_{13}$, which forms a current mirror with the transistors $M_4$ an $M_5$. To achieve the unequal currents, the transistors $M_5$ and $M_{13}$ are preferably designed to have a channel width-to-length ratio three times that of the transistor $M_4$, so that the drain-to-source current through each of the transistor $M_5$ and $M_{13}$ is three times that of transistor $M_4$. Thus, the current through transistor $M_5$, which discharges the node 620, is $I_{REF}$. The precise condition under which the node 620 discharges is given by the following Equations (A)–(C):

$$I_{REF} > i(M_3) = i(M_1) = \frac{I_{REF}}{3} + i(C_i) \qquad \text{Eqn. (A)}$$

$$\frac{2 \cdot I_{REF}}{3} > i(C_1) = C_1 \frac{d}{dt} v(C_1) = C_1 \frac{d}{dt}[x'(t) - v_{GSM1}] \approx C_1 x''(t) \qquad \text{Eqn. (B)}$$

$$x''(t) < \frac{2 \cdot I_{REF}}{3 \cdot C_1} \qquad \text{Eqn. (C)}$$

When the condition stated in Equation (C) is met, then the voltage at the node 620 decays to ground at a rate determined by the parasitic capacitance at the node 620 and the difference between the currents in $M_3$ and $M_5$, i.e., $I_{REF}-i(M_3)$. When x'(t) stops charging the capacitor $C_1$, such as after a local peak in x'(t), then no current flows through $C_1$ and as a result $i(M_1)=I_{REF}/3$. Due to the current mirror, $i(M_3)=I_{REF}/3$ as well. Thus, in that case, the greater current $I_{REF}$ through the transistor $M_5$ rather quickly pulls the voltage at the node 620 low, where it stays until a larger subsequent value of x'(t) causes the capacitor $C_1$ to charge further.

The initial decay rate of the voltage at the node 620 (after $x''(t)<2I_{REF}/3C_1$ but before the capacitor $C_1$ stops charging) should be carefully selected. If the initial decay rate is too fast, then the voltage at the node 620 will decay to ground before x"(t) crosses zero, and no edges will be rendered. If the initial decay rate is too slow, then the gate will remain open and qualify trailing peaks which are near in time to the peak having maximum amplitude. For a given system, the reference current $I_{REF}$ is therefore ideally chosen to ensure that all legitimate edges are rendered while still rejecting as many trailing peaks as possible.

The transistor $M_4$ provides a small DC current to overcome whatever leakage current may flow in the transistors $M_1$ and $M_2$. Without the current from $M_4$, the leakage current from the transistors $M_1$ and $M_2$ would be integrated by the capacitor $C_1$, causing the voltage at the node 610 to increase to near $V_{DD}$. Thus, the current in $M_4$ should be chosen to be greater than the maximum possible leakage current through the transistors $M_1$ and $M_2$. If the current through $M_4$ is too large, on the other hand, the gate-to-source voltage drop of $M_1$ could become large enough to limit dynamic range, especially if the supply voltage $V_{DD}$ is low. Further, $i(M_4)$ must be significantly smaller than $i(M_5)$ to ensure that the voltage at the node 620 drops quickly to ground after the first derivative slope drops below the threshold. By providing both currents from a common current mirror as shown, all of these conditions may be met. While a 3:1 ratio is used in this example, other ratios may be chosen which would also meet the above criteria.

In the absence of the first derivative signal x'(t), baseline noise can cause the voltage at the node 620 to qualify illegitimate edges. To counteract that problem, which could cause a downstream decoder to expend resources processing spurious edges, potentially overloading the decoder to the point where legitimate edges are ignored, the voltage at the node 620 is qualified by AND-ing it with the gated peak signal $y_R(t)$, which is true when x'(t) exceeds a threshold generated conventionally (as in U.S. Pat. No. 4,000,397). The logical AND-ing of these two signals occurs at an AND gate 625, as shown in FIG. 6. In this way the positive features of the conventional threshold gating (such as noise immunity in the absence of signal) and the added benefit of rejection of trailing peaks are both achieved.

Figure 7:
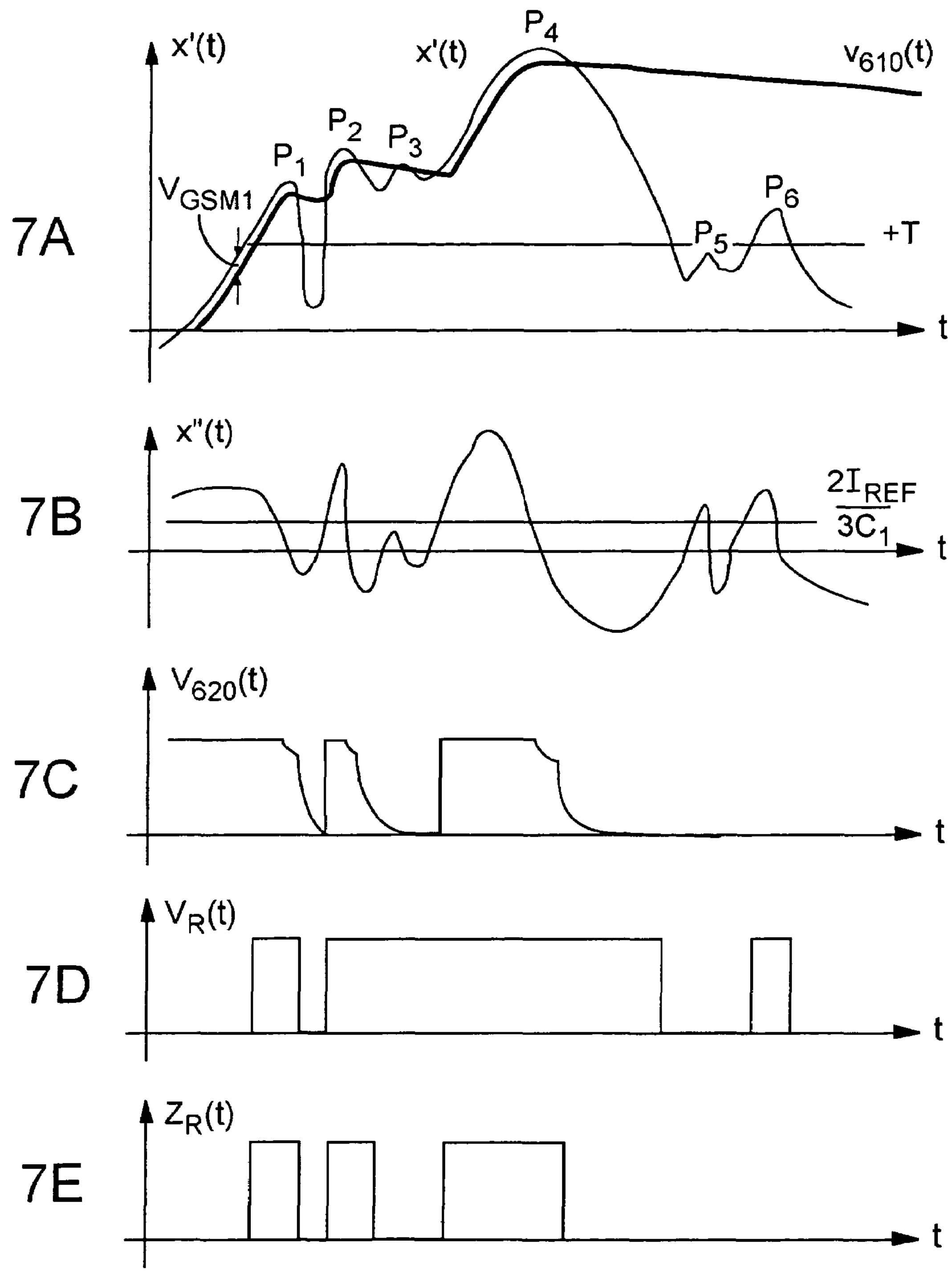
FIGS. 7A–7E are a set of voltage-versus-time plots for various signals in the circuit of FIG. 6.

FIG. 7 is a set of voltage-versus-time plots for various signals in the circuit 600. FIG. 7A is a plot of a portion of x'(t), just as in FIG. 5, and a plot of the voltage $v_{610}(t)$ across the capacitor $C_1$ at the node 610. While x'(t) is initially rising, the capacitor $C_1$ is charging, and the voltage $v_{610}(t)$ tracks x'(t) except for a small voltage drop $V_{GSM1}$ across the transistor $M_1$. However, when x'(t) reaches a peak and begins falling, then the capacitor no longer charges and in fact begins discharging slowly due to the current in $M_4$, until x'(t) exceeds the voltage $v_{610}(t)+V_{GSM1}$ again. Thus, the voltage $v_{610}(t)$ is a peak-rectified version of x'(t). FIG. 7A also shows the threshold +T, which is applied to the generation of the signal $y_R(t)$. FIG. 7B is a plot of x"(t), the derivative of x'(t). Also shown on FIG. 7B is the threshold level $2I_{REF}/3C_1$. FIG. 7C is a plot of the voltage $v_{620}(t)$ at the node 620. As explained above, the voltage $v_{620}(t)$ is at a high value when x"(t) exceeds the threshold level $2I_{REF}/3C_1$. Otherwise, the voltage $V_{620}$ decays as shown. FIG. 7D is a plot of $y_R(t)$, assuming the threshold shown in FIG. 7A. FIG. 7E is a plot of $z_R(t)$, which is the logical AND-ing of the voltage $V_{620}$ and $y_R(t)$. As can be seen, $z_R(t)$ contains pulses corresponding to the peaks $p_1$, $p_2$, and $p_4$, but not the trailing sub-maximum peaks $p_3$, $p_5$, and $p_6$.

Figure 8:
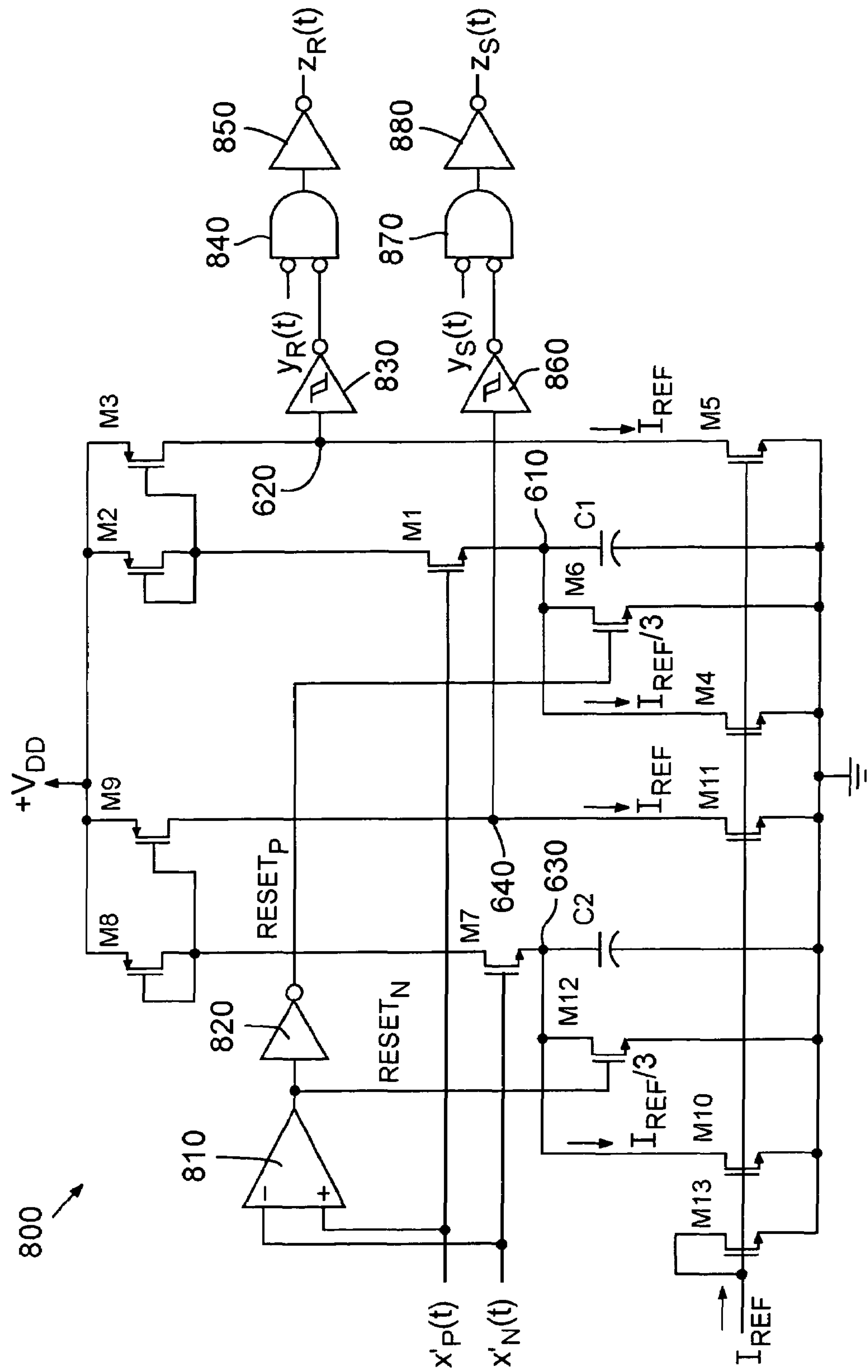
FIG. 8 is a schematic diagram of a dual peak processing circuit in the bar code reader of FIG. 3.

FIG. 8 is a schematic diagram of one circuit 800 implementing both halves (STV and RTV) of the multiple peak processing circuit 310. In the circuit 800, the first derivative signal x'(t) is a differential signal. The two signals making up the differential pair are $x'_P(t)$ and $x'_N(t)$, the positive and negative sides, respectively. The circuit 800 contains two separate circuits, each like the circuit 600, one for each signal of the differential pair. The first circuit, which processes $x'_P(t)$ comprises the transistors $M_1$–$M_5$, capacitor $C_1$, and the nodes 610 and 620, just as in the circuit 600. The other circuit, which processes $x'_N(t)$, comprises transistors $M_7$–$M_{11}$, a capacitor $C_2$, and nodes 630 and 640 in the same configuration as the transistors $M_1$–$M_5$, the capacitor $C_1$, and the nodes 610 and 620, respectively.

In addition, the circuit 800 comprises additional circuitry to selectively enable and disable the two circuits such that only one operates at any given time. That additional circuitry comprises a comparator 810, an inverter 820, and two transistors $M_6$ and $M_{12}$. The inputs of the comparator 810 are the differential pair $x'_P(t)$ and $X'_N(t)$. The output of the comparator 810 is a signal labeled $RESET_N$, which is input to the inverter 820 to produce a signal labeled $RESET_P$. The signal $RESET_N$ is high and the signal $RESET_P$ is low during a positive half cycle of x'(t), when $x'_P(t)>x'_N(t)$. During that time, the signal $RESET_N$, which is connected to the gate of the transistor $M_{12}$, causes the transistor $M_{12}$ to turn on and thereby to short the capacitor $C_2$. Also, during that time, the signal $RESET_P$, which is connected to the gate of the transistor $M_6$, causes the transistor $M_6$ to turn off, thus allowing the capacitor $C_1$ to charge in response to $x'_P(t)$ and the first circuit to operate normally. Conversely, during a negative half cycle of x'(t), when $X'_N(t)>x'_P(t)$, the transistor $M_6$ turns on, shorting the capacitor $C_1$, while the transistor $M_{12}$ turns off, allowing the second circuit to operate normally.

Finally, the circuit 800 comprises two similar circuits for combining the voltages at the nodes 620 and 640 with the gated peak signals $y_R(t)$ and $y_S(t)$, respectively. The first of those circuits comprises an inverter 830 with hysteresis, a negative-input AND gate 840, and an inverter 850. The second of those circuits comprises an inverter 860 with hysteresis, a negative-input AND gate 870, and an inverter 880 in an identical configuration. The particular configuration of those elements in the circuit 800 is for the case when $y_S(t)$, $y_R(t)$, $z_S(t)$, and $z_R(t)$ are low-true signals.

The circuit 800 can be built using discrete components or as an integrated circuit (IC) alone or in combination with circuitry for other parts of an optical code reader. One advantage of the circuit 800 in IC form is that it requires relatively little die area. While the circuit 800 has been illustrated with transistors $M_1$–$M_{13}$ as field-effect transistors (FETs), they may be of any type.

Moreover, the circuit 800 can be implemented digitally rather than in analog form. One way to do so is to convert the scan line signal x(t) to a digital form (with suitable pre-amplification and anti-alias filtering) and feed the digitized signal to a special-purpose digital logic circuit (e.g., a digital application specific integrated circuit (ASIC) or programmable logic array) or a processor (e.g., a general-purpose microprocessor or digital signal processor (DSP)), which is programmed to implement the steps 420–450 of the method 400. Although the analog form of the circuit 800 is preferred at the present time because of its lower cost and power consumption, those factors may change in the future.

Figure 9:
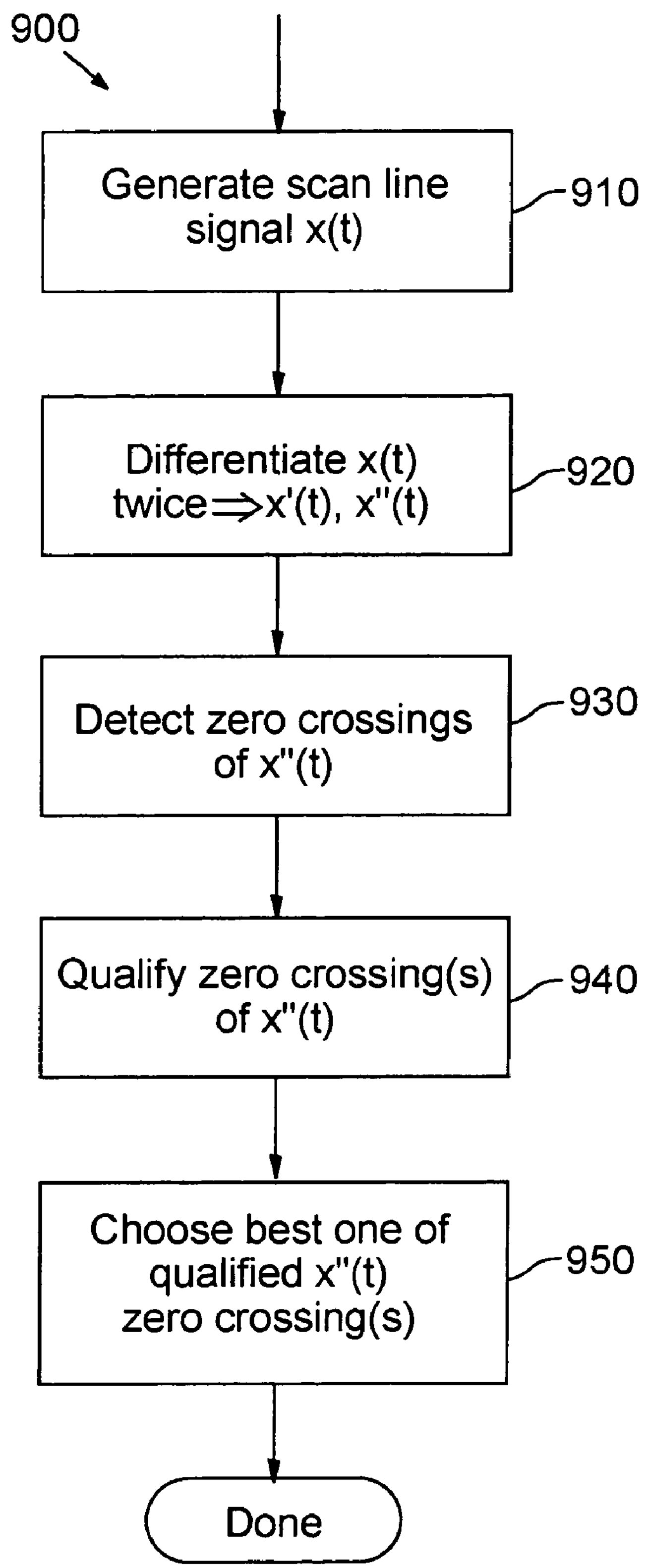
FIG. 9 is a flowchart of a method according to one embodiment.

More generally, the method 400 and similar methods can be implemented in special-purpose digital hardware or programmed for execution on a processor. An alternative method 900, which is also suitable for digital implementation, is illustrated in FIG. 9. The method 900 begins by generating (step 910) a scan line signal x(t) and differentiating (step 920) it twice to yield x'(t) and x"(t). Next, the method 900 detects (step 930) zero crossings of x"(t). It is the zero crossings of x"(t) that indicate, albeit possibly ambiguously, locations of edges in the binary optical code that the scan line signal x(t) represents, albeit imperfectly. To resolve that possible ambiguity, the method 900 performs a qualifying step 940 and a choosing step 950. The qualifying step 940 detects the substantially simultaneous occurrence of two conditions: (1) x"(t) having a magnitude greater than a threshold, i.e., $|x''(t)|>T_2$, and (2) x'(t) having a maximum magnitude since its last zero crossing. The circuit 600 performs the qualifying step 940 in analog form, where the threshold $T_2=2I_{REF}/3C_1$, and the voltage $v_{610}(t)$ at the node 610 approximately tracks the maximum magnitude of x'(t) over a half cycle. Referring to FIG. 7C, the voltage $v_{620}(t)$ at the node 620 represents substantially simultaneous occurrence of conditions (1) and (2) for a positive half cycle. Finally, the method 900 chooses (step 950) the most likely one of the qualified zero crossings of x"(t). As explained above, that is the one occurring last in time in a half cycle of x'(t). Note that the steps of the method 900 can be performed in an order different from that illustrated, or in some cases simultaneously; FIG. 9 is presented in a simplified, linear order of steps to most readily teach the concepts involved, not to imply a particular order of operations.

The methods and systems illustrated and described herein can exist in a variety of forms both active and inactive. For example, they can exist as one or more software programs comprised of program instructions in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims, and their equivalents, in which all terms are to be understood in their broadest reasonable sense unless otherwise indicated.

The invention claimed is:

1. A method for detecting edges in a binary optical code by processing a signal imperfectly indicating perceived regions of relatively dark and relatively light areas arranged in an alternating pattern as part of a binary optical code, the method comprising:

differentiating the signal to form a first derivative of the signal, the first derivative having at least in part a series of successive local peaks of the same polarity;

ignoring peaks in the series having a peak value less than any previous peak value in the series, thereby producing a resulting set of unignored peaks having one unignored peak occurring last in order;

choosing from the unignored peaks in the series the one peak occurring last in order; and generating, according to the chosen peak, a signal indicative of an edge between a light area and a dark area in the pattern.

2. The method of claim 1, wherein the ignoring step comprises:

peak-rectifying the first derivative signal; and selectively charging or discharging a node based on the peak-rectifying step.

3. The method of claim 2, wherein the peak-rectifying step generates a peak rectified version of the first derivative, and the step of selectively charging or discharging comprises:

charging the node while the first derivative is rising by at least a predetermined rate; and discharging the node while the first derivative is not rising.

4. The method of claim 1, further comprising:

comparing the first derivative to a threshold, and wherein the generating step is further based in-part on the comparison of the first derivative to the threshold.

5. The method of claim 1, further comprising:

differentiating the first derivative so as to generate a second derivative of the signal;

detecting zero crossings of the second derivative; and wherein the generating step is further based in-part on the zero crossings of the second derivative.

6. The method of claim 1, wherein the optical code is a bar code, the relatively light areas are spaces in the bar code, and the relatively dark areas are bars in the bar code.

7. The method of claim 1, wherein the series of local peaks of the same polarity is a series of positive local peaks.

8. The method of claim 1, wherein the differentiating, ignoring, choosing, and generating steps are performed by a processor.

9. The method of claim 1, wherein the differentiating, ignoring, choosing, and generating steps are performed by a digital logic circuit.

10. A computer-readable medium on which are embedded program instructions performing the method of claim 1.

11. A circuit for detecting edges in a binary optical code, the circuit comprising:

means for receiving a signal imperfectly indicating perceived regions of relatively dark and relatively light areas arranged in an alternating pattern as part of a binary optical code;

means for differentiating the signal to form a first derivative of the signal, wherein the first derivative may have a series of successive local peaks of the same polarity;

means for ignoring peaks in the series having a peak value less than any previous peak value in the series, thereby resulting in a set of unignored peaks, said set having one unignored peak occurring last in order;

means for choosing from the unignored peaks in the series the one peak occurring last in order; and means for generating, according to the chosen peak, a signal indicative of an edge between a light area and a dark area in the pattern.

12. The circuit of claim 11, wherein the means for ignoring comprises:

means for peak-rectifying the first derivative signal so as to generate a peak rectified version of the first derivative; and means for selectively charging or discharging a node based on the peak rectified version of the first derivative.

13. The circuit of claim 12, wherein the means for selectively charging or discharging comprises:

means for charging the node while the first derivative is rising by at least a predetermined rate; and means for discharging the node while the first derivative is not rising.

14. A circuit for processing an input signal derived from a binary optical code, the input signal having a series of multiple successive local peaks of the same given polarity, the circuit comprising:

a peak rectifier having an input receiving the input signal, the peak rectifier producing an output that approximately tracks the input signal while the input signal is sloping in the direction of the given polarity and that approximately holds near those local peaks having successively larger magnitude;

an output node;

a current mirror connected to the peak rectifier and the output node, the current mirror charging the output node while the peak rectifier is tracking the input signal; and a discharge path connected to the output node, the discharge path providing for discharge of the output node while the peak rectifier is holding near a local peak value of the signal.

15. The circuit of claim 14, wherein the peak rectifier comprises a transistor and a capacitor.

16. The circuit of claim 15, further comprising:

a discharge path connected across the capacitor for discharging the capacitor at a rate less than a rate at which the output node discharges.

17. The circuit of claim 16, further comprising:

a current mirror that establishes the discharge rate through the discharge path.

18. The circuit of claim 14, wherein the input signal is a first derivative of a signal imperfectly indicating perceived regions of relatively light and dark areas arranged in an alternating pattern as part of a binary optical code.

19. The circuit of claim 18, further comprising:

a differentiator having an input receiving the signal imperfectly indicating perceived regions of relatively light and dark areas arranged in an alternating pattern, the differentiator generating an output that is the input signal.

20. The circuit of claim 18, wherein the optical code is a bar code, the relatively light areas are spaces in the bar code, and the relatively dark areas are bars in the bar code.

21. The circuit of claim 18, further comprising:

a first comparator that compares the input signal to a threshold, the first comparator producing an output when the input signal exceeds the threshold; and a first logic gate having inputs connected to the output node and the output of the first comparator.

22. The circuit of claim 21, further comprising:

a differentiator having an input receiving the input signal, the differentiator producing an output that is a second derivative of the signal imperfectly indicating perceived regions of relatively light and dark areas arranged in an alternating pattern;

a second comparator having an input receiving the second derivative signal, the comparator configured to generate an output indicative of a zero crossing of the second derivative; and a second logic gate having inputs receiving the output of the first logic gate and the output of the second comparator.

23. A system for processing a signal imperfectly indicating perceived regions of relatively light and dark areas arranged in an alternating pattern as part of a binary optical code, the system comprising:

a differentiator that generates a first derivative of the signal;

a first comparator, connected to the differentiator, that compares the first derivative to a first threshold, the first comparator producing an output when the first derivative exceeds the first threshold;

a second comparator, connected to the differentiator, that compares the first derivative to a second threshold, the second comparator producing an output when the first derivative is less than the second threshold; and a circuit receiving as inputs the first derivative, the output of the first comparator, and the output of the second comparator, the circuit generating a first output representative of a largest magnitude positive peak in a series of consecutive positive local peaks in the first derivative and a second output representative of a largest magnitude negative peak in a series of consecutive negative local peaks in the first derivative.

24. The system of claim 23, further comprising:

a third comparator, connected to the differentiator, that generates a signal indicative of the sign of the second derivative; and a first logic gate, connected to the circuit and the third comparator, for blocking the first output of the circuit when the second derivative has a first sign; and a second logic gate, connected to the circuit and the third comparator, for blocking the second output of the circuit when the second derivative has a sign opposite of the first sign.

25. The system of claim 23, further comprising:

an envelope detector having an input receiving the first derivative, the envelope detector determining the first and second thresholds based on an envelope of the first derivative.

26. The system of claim 23, wherein the circuit comprises:

a first peak rectifier having an input receiving the first derivative, the first peak rectifier producing an output that approximately tracks to and then holds at positive peak values of the first derivative;

a first node;

a first current mirror connected to the first peak rectifier and the first node, the first current mirror charging the first node while the first peak rectifier is tracking the first derivative;

a first discharge path connected to the first node, the first discharge path providing for discharge of the first node while the first peak rectifier is holding at a peak value of the first derivative;

a second peak rectifier having an input receiving the first derivative, the second peak rectifier producing an output that approximately tracks to and then holds at negative peak values of the first derivative;

a second node;

a second current mirror connected to the second peak rectifier and the second node, the second current mirror charging the first node while the second peak rectifier is tracking the first derivative; and a second discharge path connected to the second node, the second discharge path providing for discharge of the second node while the second peak rectifier is holding at a peak value of the first derivative.

27. The system of claim 26, wherein the circuit further comprises:

a fourth comparator receiving the first derivative and generating a signal that is indicative of the sign of the first derivative and that is connected to both the first and second peak rectifiers so as to disable one of the first and second peak rectifiers but not disable the other peak rectifier at any given time.

28. The system of claim 23, further comprising:

a microcontroller programmed to a select the last positive peak in a series of consecutive positive local peaks and the last negative peak in a series of consecutive negative local peaks.

29. The system of claim 28, wherein the microcontroller is part of the circuit.

30. The system of claim 28, wherein the first derivative is a differential signal, and the first and second thresholds are equal.

31. The system of claim 28, wherein the first derivative is a single-ended signal, the first threshold is positive, the second threshold is negative, and the first and second thresholds have respective magnitudes that are equal to one another.

32. A method for determining edge positions in a binary optical code by qualifying zero crossings of a second derivative of an input signal imperfectly indicating perceived regions of relatively dark and relatively light areas arranged in an alternating pattern as part of a binary optical code, the method comprising:

computing first and second derivatives of the input signal, wherein the second derivative may have multiple zero crossings for a given edge in the binary optical code;

detecting zero crossings of the first and second derivatives; and utilizing a zero crossing of the second derivative as an indication of a possible edge position in the binary optical code, provided that the zero crossing of the second derivative is the first one occurring after the substantially simultaneous occurrence of the second derivative exceeding a threshold and the first derivative having a magnitude greater than at any previous time since the last zero crossing of the first derivative, thereby resulting in a set of one or more qualified second derivative crossings indicating possible positions for the given edge in the binary optical code.

33. The method of claim 32, further comprising:

utilizing the qualified second derivative zero crossing occurring last in time in the set as a unique indication of the position of the given edge.

34. The method of claim 32, further comprising:

receiving the input signal.

35. The method of claim 32, wherein the computing, detecting, and utilizing steps are performed by a processor.

36. The method of claim 32, wherein the computing, detecting, and utilizing steps are performed by a digital logic circuit.

37. A computer-readable medium on which are embedded program instructions performing the method of claim 32.

* * * * *